United States Patent [19]
Kerklo

[11] 3,715,176
[45] Feb. 6, 1973

[54] TURBO MACHINE ROTOR STRUCTURE

[75] Inventor: Philip Kerklo, Greensburg, Pa.

[73] Assignee: Carrier Corporation, Syracuse, N.Y.

[22] Filed: Sept. 1, 1971

[21] Appl. No.: 176,896

[52] U.S. Cl. .................................. 416/198, 416/244
[51] Int. Cl. ............................................... F01d 5/06
[58] Field of Search ..................... 416/198–201, 244

[56] References Cited

UNITED STATES PATENTS

| | | | |
|---|---|---|---|
| 1,593,393 | 7/1926 | Doran | 416/198 |
| 3,061,342 | 10/1962 | Feller | 416/244 UX |

FOREIGN PATENTS OR APPLICATIONS

| | | | |
|---|---|---|---|
| 1,256,820 | 2/1961 | France | 416/198 |

Primary Examiner—Everette A. Powell, Jr.
Attorney—Harry G. Martin, Jr. et al.

[57] ABSTRACT

The wheel shaft of a multi-stage turbo machine is formed with a succession of adjoining areas which progressively change in diameter to provide a stepped shaft arrangement. The bores in all of the wheels are the same diameter. A bushing is fixed in the bore of each wheel. The bore in each bushing has an end portion dimensioned for an interference fit with a selected area on the shaft. The opposite end portion of the bushing bore is dimensioned for a sliding fit on the shaft area. The end portions of the bushing bore are provided with shaft seals and the medial area of the bore is formed with a recess. The shaft is formed with axially extending passages which communicate with the recesses in the respective bushings for expansion and removal thereof from the shaft.

3 Claims, 2 Drawing Figures

PATENTED FEB 6 1973

3,715,176

INVENTOR.
PHILIP KERKLO

BY *Bennett Thompson*

ATTORNEY

TURBO MACHINE ROTOR STRUCTURE

BACKGROUND OF THE INVENTION

There are cases where impellers in a multi-stage machine have to be changed or shifted from one stage to another in order that the machine can meet the operational requirements imposed upon it. In general, especially in larger machines, it is preferred to attach the impeller wheels to the shaft by means of a heat shrink rather than by the use of driving keys.

In centrifugal gas compression machines, the form, dimensions, and configuration of the impellers in certain stages of the machine differ from those in other stages. In such machines the impellers perform the work and are the vital parts of the compressor and, accordingly, need to be fabricated from specially selected materials and the fabrication involves workmanship of high order. Accordingly, the impellers are a very expensive component of the machine.

With conventional production practice, it is accordingly necessary to produce and inventory a large stock of impellers in order that they may be available for interchanging from one stage of a machine to another.

SUMMARY OF THE INVENTION

This invention has as an object a rotor structure for a multi-stage turbo machine wherein all impellers are machined with the same bore. The impeller shaft is formed with a series of adjoining areas progressively changing in diameter. Adapter bushings are formed with an external dimension for a shrink fit in the impeller hub. Each bushing is bored and dimensioned in one end portion to have a shrink fit with a selected shaft area. The opposite end portion of the bushing bore is dimensioned for a sliding fit with the selected shaft area. Intermediate the end portions the bushing bore is formed with a circumferentially extending recess, and the shaft is formed with passages extending inwardly from one end thereof, each passage having communication with the recess in a bushing. This arrangement provides for the application of high hydraulic pressure between the shaft and the bushing to effect radial expansion of the bushing for the removal thereof and the associated impeller from the shaft.

DESCRIPTION OF THE PREFERRED EMBODIMENT

Figure 1:
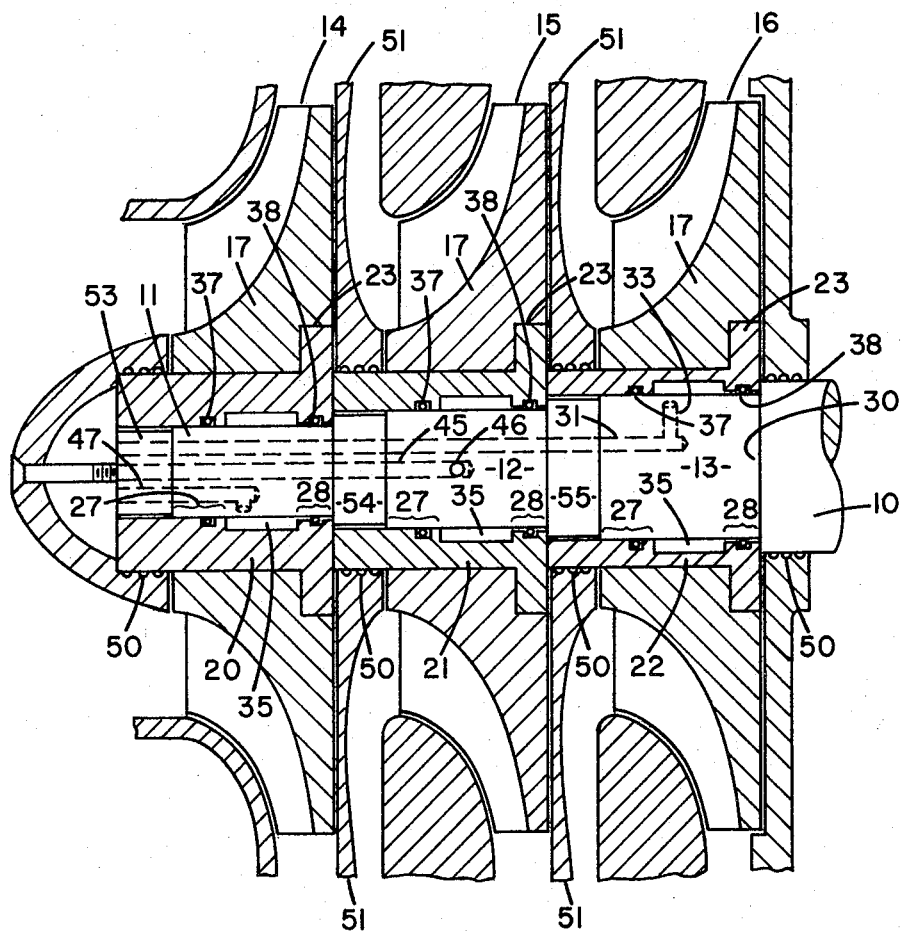
FIG. 1 is a lengthwise sectional view of an impeller shaft formed with three areas for the reception of three impellers.
Figure 2:
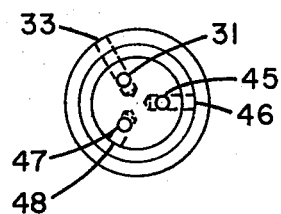
FIG. 2 is an end view of the impeller shaft looking to the right in FIG. 1.

The impeller shaft 10 is formed with a succession of adjoining areas progressively changing in diameter. In the illustrated form there are three such areas, 11, 12 and 13. Impellers 14, 15 and 16 are mounted on the areas 11, 12 and 13 respectively. The shaft areas increase in diameter from the area 11 to the area 13.

The hub portions 17 of the impellers are formed with bores of like dimension for the reception of bushings 20, 21 and 22. The rear wall of each impeller is counter bored to receive the radial flange 23 formed at the inner end of each bushing.

The bushings are fixedly mounted in the bores in the impeller hubs 17 as by a shrink fit. The bushings are formed with bores complemental to the shaft areas 11, 12 and 13. One end portion of the bore of each bushing is dimensioned to have an interference fit with a selected shaft area 11, 12 or 13. The opposite end portion of each bushing bore is dimensioned to have a sliding fit with the complemental shaft surface.

Referring to FIG. 1, the end bore area of bushing 22 indicated at 27 is dimensioned to have an interference fit with the shaft area 13, whereby the bushing may be fixedly secured to the shaft area by a shrink fit. The opposite end portion 28 of the bushing bore is dimensioned to have a sliding fit with the shaft area 13. With this arrangement, the bushing 22 may be heated and readily moved axially on the shaft area 13 with the inner end of the bushing abutting against the shoulder 30. Upon the cooling of the bushing, a shrink fit is obtained between the bushing bore area 27 and the shaft surface 13, whereby the bushing and the impeller 16 become fixedly secured to the shaft 10.

To effect removal of the bushings and impellers from the shaft 10, the bushings are expanded by the application of fluid under high pressure between the periphery of the shaft portion and the bore of the bushing mounted thereon. To effect the application of hydraulic fluid under high pressure, the shaft 10 is formed with passages extending axially inward from the outer end of the shaft. For example, a passage 31 communicates at its inner end with a radial passage 33 extending through the periphery of the shaft area 13 for the discharge of hydraulic fluid against the bore of the bushing 22.

To provide for the ready flow of the hydraulic fluid uniformly about the periphery of the shaft area, the same may be formed with a groove in the peripheral surface thereof, or the bushing may be formed with a circumferentially extending groove as shown in the drawings at 35. A seal 37 is mounted in the end portion 27 of the bushing bore, and a like seal 38 positioned in the inner bore end portion 28. The seals 37, 38 serving to prevent the axial flow of hydraulic fluid from the central portion of the bushing bore. The seals 37, 38 are formed of material not adversely affected by the shrink fit temperature.

Sufficient hydraulic pressure is established to effect sufficient expansion of the bushing so that it can be moved axially from the shaft area on which it is mounted. The radial passage 33 is located, relative to the axial dimension of the groove 35, so that the high hydraulic pressure will be maintained against the bushing until the shrink fit area 27 of the bushing bore has been moved from the shaft area 13. Thereupon, the bushing, and the impeller carried thereby, can be readily removed from the shaft area 13, in view of the fact that the inner end portion 28 of the bushing bore is dimensioned with a sliding fit on the shaft area 13.

The same structural arrangement is provided in respect to the other bushings 20, 21 mounted in impellers 14, 15 and mounted on the shaft areas 11, 12. The axial passage 45 has communication with a radial passage 46 communicating with the groove 35 in bushing 21. The axially extending passage 47 communicates with a radial passage 48 communicating with the groove 35 in bushing 20, whereby the bushings 20, 21 are removable from the shaft areas 11 and 12 in the manner above described.

The bushings 21, 22 may be dimensioned axially to extend forwardly beyond the intake side of the impeller hubs 17 to provide a running surface with the labyrinth seals 50 on diaphragms 51. The bushing 20 may also extend forwardly from the intake side of the impeller 14. If the bushings are so formed, the shaft 10 is formed with areas 53, 54, 55 having diameters less than the adjacent shaft areas 11, 12 and 13 to provide a clearance with the bore in the extending end portions of the bushings.

With the rotor structure of my invention as described, the impellers may be shifted from one stage of the machine to another by removing the bushing from an impeller and replacing it with a bushing dimensioned to be mounted on a different shaft area. This results in a reduction in the cost of machining the impellers inasmuch as they are all formed with the same hub bore dimensions. Likewise, there is a reduction in the cost of producing the bushings in that their external dimensions are all uniform.

While a preferred embodiment of this invention has been described for purposes of illustration, it will be appreciated that this invention may be otherwise embodied within the scope of the following claims.

I claim:

1. A rotor structure for multi-stage turbo machines including an impeller shaft formed with a succession of adjoining areas progressively changing in diameter, an impeller mounted on each of said shaft areas, all of said impellers having bores of like diameter, a bushing fixedly mounted in the bore of each of said impellers, each of said bushings being formed with a bore having an end portion forming an interference fit with a selected shaft area, the opposite end portion of said bore having a sliding fit with said shaft area, a shaft seal positioned in each end portion of the bushing bore, said shaft being formed with passages extending axially from one end of said shaft, each of said passages serving for the conveyance of hydraulic pressure against the bore of a bushing intermediate said seals therein and the shaft area on which the bushing is mounted for the expansion of the bushing and removal thereof from the shaft area.

2. A rotor structure as defined in claim 1, wherein the bore of each of said bushings is formed intermediate the seals therein with a circumferentially extending groove.

3. A rotor structure as set forth in claim 1, wherein said end portion of the bore in each of said bushings having said interference fit with said shaft is located at the inlet end of the impeller.

* * * * *